United States Patent
Tolpin et al.

(10) Patent No.: US 11,496,356 B2
(45) Date of Patent: Nov. 8, 2022

(54) DEVICE LIFECYCLE MANAGEMENT VIA A CENTRAL IDENTITY SERVICE

(71) Applicant: MICROSOFT TECHNOLOGY LICENSING, LLC, Redmond, WA (US)

(72) Inventors: Alexander I. Tolpin, Redmond, WA (US); Tamer Awad, Redmond, WA (US); Timothy James Larden, Bellevue, WA (US); Puneet Gupta, Jersey City, NJ (US); Rajeev Mandayam Vokkarne, Sammamish, WA (US); Jelani Z. Brandon, Woodinville, WA (US); SachinKumar ChandraMohan, Irvine, CA (US); Mounica Arroju, Redmond, WA (US); Nicole Berdy, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 607 days.

(21) Appl. No.: 16/102,558

(22) Filed: Aug. 13, 2018

(65) Prior Publication Data

US 2020/0052962 A1    Feb. 13, 2020

(51) Int. Cl.
*H04L 41/0806* (2022.01)
*H04L 41/084* (2022.01)
(Continued)

(52) U.S. Cl.
CPC ........ *H04L 41/0806* (2013.01); *H04L 41/084* (2013.01); *H04L 41/0893* (2013.01);
(Continued)

(58) Field of Classification Search
CPC . H04L 41/5009; H04L 12/66; H04L 41/0813; H04L 67/24; H04L 41/0806;
(Continued)

(56) References Cited

U.S. PATENT DOCUMENTS

| 6,529,966 | B1 * | 3/2003 | Willman | G06F 9/4411 |
| | | | | 710/10 |
| 6,993,038 | B2 * | 1/2006 | McCann | H04Q 3/0025 |
| | | | | 370/401 |

(Continued)

FOREIGN PATENT DOCUMENTS

WO    2011112683 A1    9/2011

OTHER PUBLICATIONS

"Mobile Device Management (MDM) for Google Android", Retrieved from: https://www-03.ibm.com/security/za/en/maas360/android-mdm/, Retrieved on Jul. 12, 2018, 9 Pages.
(Continued)

*Primary Examiner* — Sargon N Nano
(74) *Attorney, Agent, or Firm* — Holzer Patel Drennan (57) ABSTRACT

Managing devices in an IoT environment. A method includes, as a result of a device being provisioned by a special-purpose solution, storing at a central unified registry a correlation of the device and the given special purpose solution. The method further includes correlating the device to a different special-purpose solution at the unified registry. As a result, the method further includes causing subsequent configuration of the device to be performed by the different special-purpose solution.

20 Claims, 4 Drawing Sheets

(51) Int. Cl.
  *H04L 41/0893* (2022.01)
  *H04L 41/5003* (2022.01)
  *H04L 67/12* (2022.01)
  *H04L 67/51* (2022.01)
  *H04L 41/12* (2022.01)

(52) U.S. Cl.
  CPC .......... *H04L 41/5003* (2013.01); *H04L 67/12* (2013.01); *H04L 67/51* (2022.05); *H04L 41/12* (2013.01)

(58) Field of Classification Search
  CPC ............. H04L 29/06231; H04L 5/0007; H04L 41/0233; H04L 41/0816; H04W 4/70; H04W 4/029; H04W 4/38; G06F 11/0733; G06F 11/079
  See application file for complete search history.

(56) References Cited

U.S. PATENT DOCUMENTS

| | | | |
|---|---|---|---|
| 7,062,642 B1 | 6/2006 | Langrind et al. | |
| 7,644,145 B2* | 1/2010 | Rockwell | G06Q 10/0875 358/1.15 |
| 9,762,556 B2* | 9/2017 | James | H04L 63/0442 |
| 10,289,325 B1* | 5/2019 | Bono | G06F 3/0622 |
| 10,306,473 B2* | 5/2019 | Roche | H04W 12/08 |
| 10,433,177 B2* | 10/2019 | Kodaypak | H04W 72/048 |
| 10,693,948 B2* | 6/2020 | Neogi | H04L 43/16 |
| 2002/0178249 A1* | 11/2002 | Prabakaran | G06F 11/1451 709/223 |
| 2006/0021019 A1 | 1/2006 | Hinton et al. | |
| 2006/0041423 A1* | 2/2006 | Kline | G06F 11/3676 704/9 |
| 2011/0258620 A1* | 10/2011 | Gao | G06Q 10/06 717/178 |
| 2013/0241697 A1 | 9/2013 | Baumert et al. | |
| 2015/0156266 A1 | 6/2015 | Gupta | |
| 2016/0182459 A1* | 6/2016 | Britt | H04L 63/061 713/171 |
| 2017/0064524 A1* | 3/2017 | Chu | H04M 1/72569 |
| 2017/0141968 A1* | 5/2017 | Lloyd | H04L 41/22 |
| 2017/0373860 A1* | 12/2017 | Kshirsagar | H04L 51/04 |
| 2018/0109395 A1 | 4/2018 | Berdy et al. | |
| 2018/0109650 A1* | 4/2018 | Berdy | G06F 21/305 |
| 2018/0295033 A1* | 10/2018 | Vladimirskiy | H04L 41/5054 |
| 2019/0319953 A1* | 10/2019 | Lear | H04L 63/0823 |

OTHER PUBLICATIONS

George, Sam, "Azure IoT Hub Device Provisioning Service preview automates device connection and configuration", Retrieved from: https://azure.microsoft.com/en-in/blog/azure-iot-hub-device-provisioning-service-preview-automates-device-connection-configuration/, Sep. 6, 2017, 5 Pages.

Nastic, et al., "Provisioning Software-Defined IoT Cloud Systems", In Proceedings of 2nd International Conference on Future Internet of Things and Cloud, Aug. 27, 2014, pp. 288-295.

McSwain, et al., "Device concepts for reprovisioning for the Azure ioT Hub ' Device Provisioning Service", Retrieved From: https://docs.microsoft.com/en-us/azure/iot-dps/concepts-device-reprovision, Apr. 4, 2019, 7 Pages.

"International Search Report and Written Opinion Issued in PCT Application No. PCT/US19/038811", dated Sep. 2, 2019, 14 Pages.

* cited by examiner

DEVICE LIFECYCLE MANAGEMENT VIA A CENTRAL IDENTITY SERVICE

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has allowed for the development and proliferation of so called Internet of Things (IoT) networks. In particular, physical devices can have computer hardware, software, and sensors implemented on the physical devices which allows the physical devices to communicate with each other in a networked fashion.

IoT networks are often controlled by a service provider that provides some type of service for the various devices in the IoT networks. As can be imagined, many service providers provide services to a number of different tenants, in a number of different locations, and/or at a number of different service-level agreements. Thus, a service provider may implement a number of different IoT solutions for the different locations, different tenants, and/or different service-level agreements. This may be done for certain optimization reasons.

For example, a localized solution can reduce network latency when data is passed between a device and the solution. In particular, a device may receive configuration information from a solution, collect data from sensors on the device and provide that collected data to the solution, and/or receive control information from the solution. If the solution is not within some proximate distance to the device, there may be an unacceptable amount of network latency in transferring data between the device and the solution.

Different solutions may be implemented for different tenants of a service. In particular, tenants may demand that a service provider keep their data on separate hardware and use separate software. Each solution is implemented using separate hardware and software. Thus, different solutions are often implemented to ensure data segregation between different tenants of the service.

Different solutions may implement different hardware and software having different capabilities. Thus, a service may be able to meet service level agreement for certain tenants by hosting devices for those tenants on solutions capable of meeting the agreed-upon service-level agreement. Additionally or alternatively, service providers, in the interest of efficiency, will want to use the minimum amount of hardware and software capabilities to meet a service-level agreement. Therefore, various devices for various tenants can be hosted by different solutions based on efficiency and based on meeting service-level agreements.

However, a given device may move between solutions for different reasons. For example, consider the case where a device is a vehicle or shipping container. As the device moves, a different location-based solution may be more appropriate for the given device. In an alternative example, the device may be transferred between different tenants of a service. Thus, this may cause the device to be more appropriately managed by a different solution than it was originally managed by when the device was provisioned. Alternatively, the service-level agreement for a given device may change, thus requiring the device to be serviced by a different solution.

As a result of devices moving between different solutions, a number of complexities are introduced into the system. One such complexity is the need to add and remove devices from the various registries of the solutions. Another complexity is that it can be difficult to query for devices. In particular, to find a particular set of devices, it may be necessary to query a number of different solutions. For example, there may be a desire to update all devices that are shipping container devices. However, different shipping container devices may be managed by different solutions. To update all the devices that are shipping container devices, it may be necessary to search across a number of different solutions to identify where those devices are located.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in an IoT environment, a method of managing devices in the IoT environment. The method includes, as a result of a device being provisioned by a special-purpose solution, storing at a central unified registry a correlation of the device and the given special purpose solution. The method further includes correlating the device to a different special-purpose solution at the unified registry. As a result, the method further includes causing subsequent configuration of the device to be performed by the different special-purpose solution.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

IoT devices of a given type may be connected to different cloud solutions for data collection/aggregation/processing, but it can be desirable to manage all the identities through a single interface. For example, a geo-sharded solution (where devices are managed by special-purpose solutions based on physical proximity to the special-purpose solutions) may wish to apply a configuration to all devices across per-geo solutions from a single management interface. Some embodiments illustrated herein implement a central identity service, illustrated herein as a unified registry.

Embodiments illustrated herein include an improved system which includes a number of different special-purpose solutions each managing a number of different devices along with a unified registry that registers the devices across the various different special-purpose solutions. The unified registry stores an enumeration of the various devices controlled by a service amongst all of the different special-purpose solutions along with a correlation correlating each device to the special-purpose solution managing each device. This allows for a centralized location where information about all the different devices can be discovered. Alternatively or additionally, in some embodiments the unified registry can be used to push configuration information to various devices controlled by a service.

Figure 1:
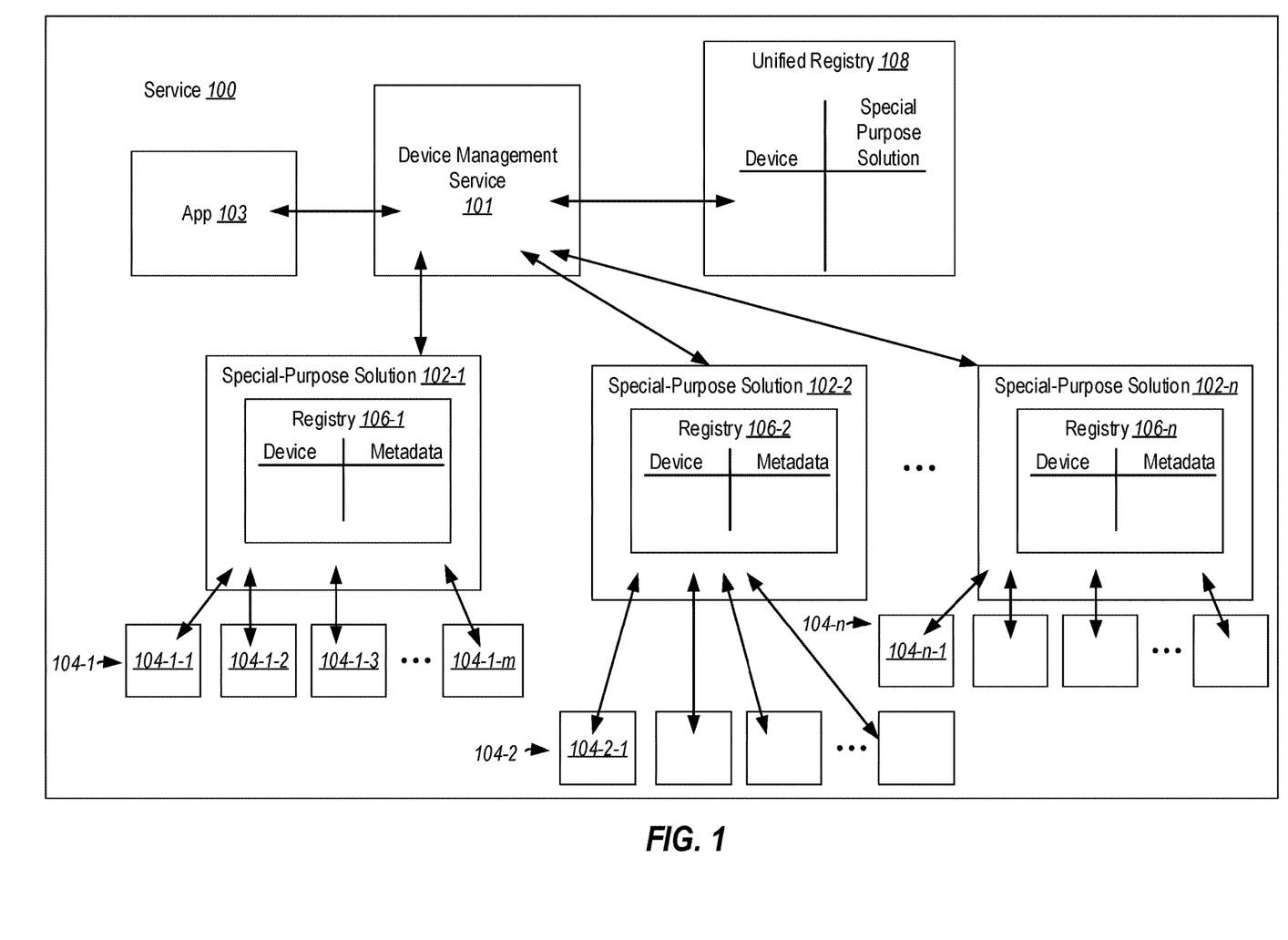
FIG. 1 illustrates a service for managing devices, including a unified registry for correlating devices to special-purpose solutions.

Reference is now made to FIG. 1. FIG. 1 illustrates a service 100. The service 100 is a distributed service that includes a number of different elements. In the particular example, the service 100 is a service for managing networks of devices. In some embodiments, the devices may be IoT devices or other smart devices.

Smart devices include various pieces of smart technology. The availability of compact smart technology has enabled virtually any device to be a smart device. For example, smart technology can be included in large smart devices such as shipping tankers, planes, cars, etc. However, miniaturization of smart technology also allows even small devices, such as watches, writing implements, coins, insect sized drones, etc. to be smart devices.

A smart device typically includes one or more processors. A smart device typically includes computer readable media, which may be, for example, computer readable memory. The computer readable media can store instructions that can be executed by the one or more processors. This gives the smart device the ability to perform digital data processing tasks. For example, the smart device can perform various computations, analyze data, generate data, generate communication data, etc.

The smart device also typically includes communication hardware. The communication hardware allows the smart device to communicate with other smart devices and/or with other digital entities. For example, the smart device may communicate with other smart devices in a network of smart devices. For example, the smart devices may be able to send and receive data generated and/or collected at the smart devices. For example, the smart device may be able to collect data from sensors included on the smart device. This sensor data can be shared among the various devices in the network of devices, and/or with solutions, for various uses.

Alternatively or additionally, smart devices may include controls. The controls may be configured to control equipment. The equipment may be items such as motors, blowers, heaters, chillers, lights, radios, etc. The smart devices may communicate with each other to cause the equipment to be controlled.

Alternatively or additionally, the smart device may be able to communicate with other digital entities, such as a special-purpose solution or other entity. For example, the smart devices may be able to communicate with the solutions for management. For example, a solution may include functionality for provisioning devices and/or controlling access to device data.

FIG. 1 illustrates a device management service 101. The device management service includes computer hardware and software configured to manage devices for the service 100. In particular, the device management service can cause devices to be updated, manage data collection from devices, manage device controls, etc.

The device management service 101 may include the ability to interface with various users of the service 100. For example, the device management service may include functionality to connect with an app 103. The app 103 may be implemented on a user device, such as a smart phone, tablet, computer, or other device. This allows a user to provide data to the device management service 101 to allow a user to request certain control over devices managed by the device management service 101. For example, tenants of the service 100 may use an instance of the app 103 to request certain actions be performed on behalf of the tenant.

FIG. 1 illustrates a number of special-purpose solutions. In particular, FIG. 1 illustrates special-purpose solutions 102-1, 102-2, through 102-*n*. The ellipses illustrated in the figure indicate that a configurable number of special-purpose solutions can be implemented in the service 100. Typically, a special-purpose solution is a collection of hardware and software configured to interface with a set of devices for configuring the devices, transmitting control information to the devices, collecting data from the devices, etc. Typically, the hardware and software in a special-purpose solution are segregated from hardware and software in other special-purpose solutions.

For example, hardware and software for one special-purpose solution may be located in a particular location to service devices in that particular location. The hardware and software for that special-purpose solution is segregated by distance from hardware and software for different special-purpose solutions located in a different location for servicing a different set of devices in a different location.

In an alternative or additional example, hardware and software for a special-purpose solution may be segregated by a tenant of the service 100. In particular, each tenant of the service is often a different enterprise or different entity that desires that their data be kept separate from other tenants of the service 100. These different tenants may require the service 100 to maintain their data on different hardware and software than other tenants. Thus, the service will maintain different special-purpose solutions, including different hardware and software, for different tenants of the service 100.

In an alternative or additional example, there may be a desire to segregate devices based on service level agreements for different devices. More capable hardware or software may be used for devices having a higher service level than other devices having a lower service level. Thus, special-purpose solutions may be specifically implemented based on service level agreements for devices such that appropriate hardware and software is utilized to comply with the service level agreements.

As discussed previously, each special-purpose solution interfaces with a plurality of devices. For purposes of example, attention is directed to the set 104 of devices. The set 104 of devices includes devices 104-1-1, 104-1-2, 104-1-3, through 104-1-$m$. Note that the ellipses illustrated indicate that a configurable number of different devices can be implemented in the set 104-1 of devices. Similarly, FIG. 1 illustrates a set 104-2 of devices and a set 104-$n$ of devices.

Note that the special-purpose solution 102-1 includes a registry 106-1. The registry 106-1 includes an enumeration of the various devices in the set 104-1 of devices correlated with metadata for the devices.

When a device is brought on-line, the device management service will typically coordinate connecting the device to a particular special purpose solution. In particular, the registry at the special purpose solution will be updated to indicate that the new device can connect to the special purpose solution.

The special-purpose solution 102-1 also includes functionality for provisioning the various devices in the set 104-1 of devices. Provisioning may include, for example, setting access requirements for the device, provisioning authentication for the device, assigning endpoints for the device, configuring the device to communicate (for obtaining data and/or providing sensor readings) with certain other devices, installing executable instructions into memory of the device, defining property values for the device, configuring sensors for the device, etc.

As noted previously, special-purpose solutions may be implemented for a number of different reasons including location-based reasons, tenant isolation reasons, service level agreement reasons, etc. Also, as noted previously, the devices in the sets 104-2 through 104-$n$, may be moved between sets such that different special-purpose solutions manage different devices over time.

Some embodiments implement a unified registry 108. The unified registry includes an enumeration of all the devices managed by the service 100 correlated with the special-purpose solutions that manage the devices. Thus, for example, the unified registry 108 might contain an entry indicating that the device 104-1-1 is managed by the special-purpose solution 102-1. Similarly, the unified registry 108 may include an entry that indicates that the device 104-2-1 is managed by the special-purpose solution 102-2.

When a device moves between special-purpose solutions, unified registry 108 can simply update the entry for the device in the unified registry 108 to so indicate. For example, if the device 104-1-1 was to be moved from the special-purpose solution 102-1 to the special-purpose solution 102-2, the device management service 101 could cause the unified registry 108 to simply update the entry for the device 104-1-1 in the unified registry 108 to indicate that the special-purpose solution 102-2 is now managing the device 104-1.

Note that by implementing the unified registry 108, embodiments can quickly identify which special-purpose solution is managing a particular device. For example, the device management service 101 can simply query the unified registry 108 to find the special-purpose solution that is managing a device, rather than needing to query several of the special purpose solutions until it can be determined which special purpose solution is managing a device.

Note that in some embodiments, the unified registry 108 may further include additional metadata information about each device. For example, unified registry 108 may include information identifying model number, firmware version, initial app set for installation, location tags, desired use-cases, desired frequency of telemetry connections, and/or other information. This may allow entities to search and locate devices having certain characteristics by searching against the unified registry 108, rather than needing to search each of the individual special purpose solutions 102-1 through 102-$n$.

When a given device needs to provide data collected or generated at the device, or to receive information from other devices or services, this is coordinated through the appropriate special-purpose solution. However, in some embodiments, the device will query the unified registry 108 to discover the appropriate special-purpose solution. The unified registry 108 can notify the device which special-purpose solution it should connect to for sending and receiving information.

In one illustrative example, a device may be provisioned by a first special-purpose solution and may be connected to the first special-purpose solution for sending and receiving data. However, at a subsequent time, the device may be moved to a different special-purpose solution. For subsequent provisioning and/or data communication, the device will first query the unified registry 108 to determine which special-purpose solution the device should be communicating with. The device can then connect to the appropriate special-purpose solution as indicated in the unified registry 108.

In some embodiments, the unified registry 108 synchronizes appropriate portions with various registries in special-purpose solutions. For example, as a device is moved between special-purpose solutions, the unified registry 108 will change the information that should be maintained by the various registries in the special-purpose solutions. In some embodiments, the unified registry 108 contains the authoritative record of which devices are managed by which special-purpose solutions. Thus, the unified registry 108 may include computing processes which are able to identify enumerations of devices for a particular special-purpose solution. All devices in the unified registry for a particular special-purpose solution can be identified, and a replacement registry can be created based on the identification. The replacement registry can then be pushed to the special-purpose solutions to replace the registry at the special-purpose solution. This can be done on a periodic basis.

Alternatively or additionally, this may be an event-based process such that any time a change is made to the unified registry changing the special-purpose solution correlated to a particular device, a new replacement registry is created for that special-purpose solution and pushed to the special-purpose solution. Alternatively or additionally, in some embodiments, when changes are made to the unified registry 108 changing the special-purpose solution correlated to a device, updates can be made to the affected special-purpose solution registries. For example, when a device moves from one special-purpose solution to another special-purpose solution, the change will be made in the unified registry 108. The unified registry will then push the changes to the registries of the affected special-purpose solutions. In particular, the unified registry 108 will direct that an entry be removed from the registry of the special-purpose solution that the device is moving from. The unified registry 108 will also be directed that a new entry be made in the registry for the special-purpose solution to which the devices moving to. This will allow the registries in the special-purpose solutions to be accurately maintained.

Figure 2:
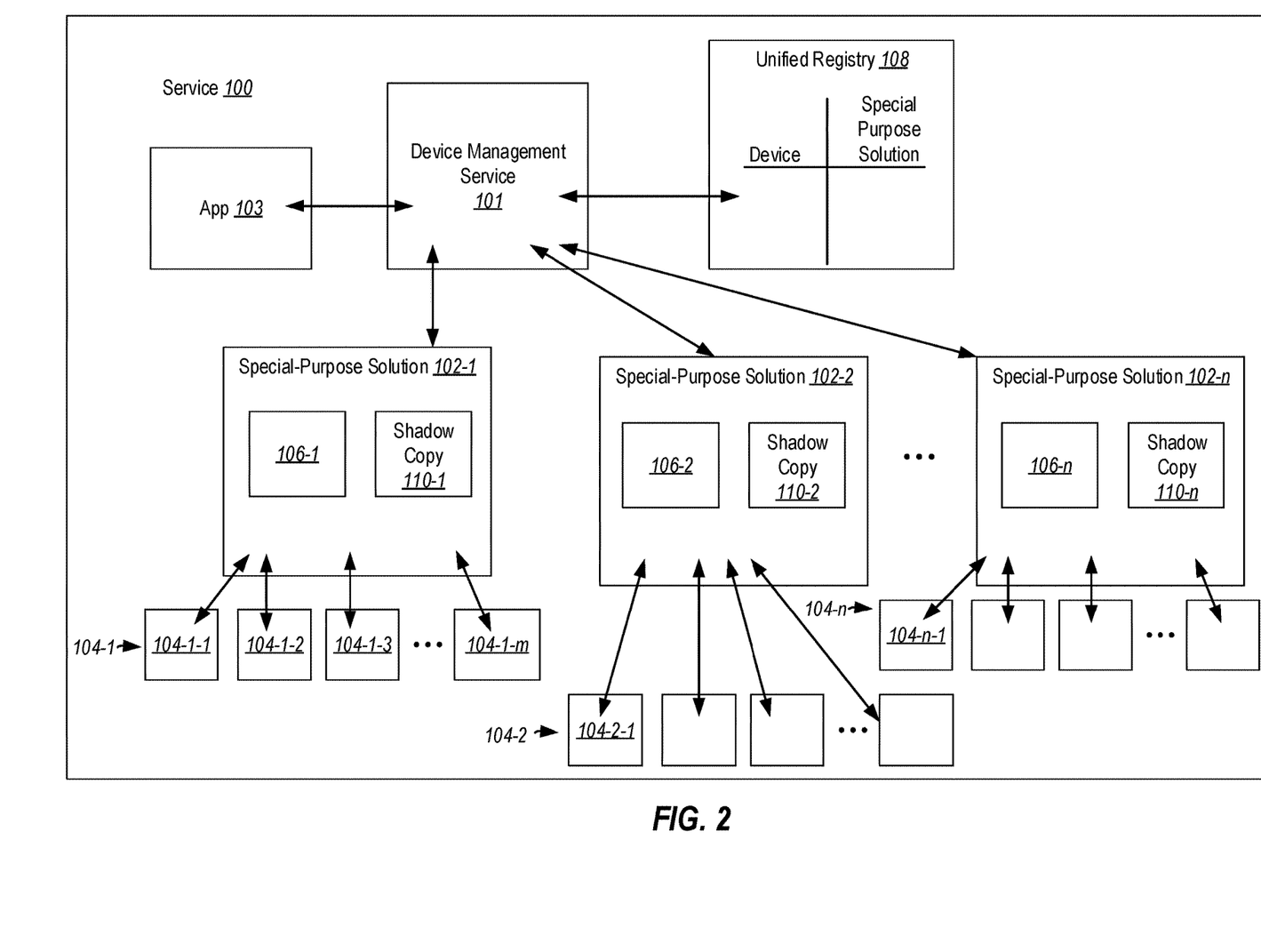
FIG. 2 illustrates the service for managing devices, including a unified registry for correlating devices to special-purpose solutions, where the special purpose solutions include a shadow copy of the unified registry.

Referring now to FIG. 2 an additional or alternative embodiment is illustrated. In some embodiments, each of the special-purpose solutions may include a shadow copy of the unified registry 108. In some such embodiments, each special-purpose solution will include its own special-purpose registry, as illustrated previously, along with a shadow copy of the unified registry 108. For example, FIG. 2 illustrates that the special-purpose solution 102-1 includes the registry 106-1 along with a shadow copy 110-1 of the unified registry 108. The shadow copy typically includes a copy of all of the information in the unified registry 108. Although, in some embodiments, the shadow copy may include only a correlation of devices with special purpose solutions, while excluding other metadata stored at the unified registry.

Using a shadow copy may be useful such that devices do not need to query the actual unified registry 108 to determine which special-purpose solution the devices should connect to. For example, if a device is proximate the special-purpose solution 102-1, the device can query the shadow copy 110-1 of the unified registry 108 at the special-purpose solution 102-1 to determine which special-purpose solution the device should connect to. In this example, the device may discover that it should connect to the special-purpose solution 102-1 or that it should connect to a different special-purpose solution.

FIG. 2 illustrates that each of the special-purpose solutions 102-1 through 102-n include shadow copies 110-1, 110-2, through 110-n of the unified registry 108. Thus, devices connecting to any special purpose solution can query the shadow copy at the special purpose solution to identify the appropriate special purpose solution for the device. Note that other entities may query the shadow copies to obtain device information.

The shadow copies may be updated on a periodic basis. Alternatively or additionally, the shadow copies may be updated any time there is a change to the unified registry 108.

Note that embodiments may advantageously implemented over previous solutions, in that devices can be moved between special-purpose solutions even when the devices are not online. In particular, there is no requirement that device be connected to a network to be moved between special-purpose solutions. Rather, an entry can simply made in the unified registry 108 to indicate that the change has been made.

In some embodiments, when the device has been off-line, the device will connect to the unified registry 108 to identify which special-purpose solution the device should connect to. In some embodiments, this may result in additional configuration pushed to the device when the device connects to a new special-purpose solution.

Figure 3:
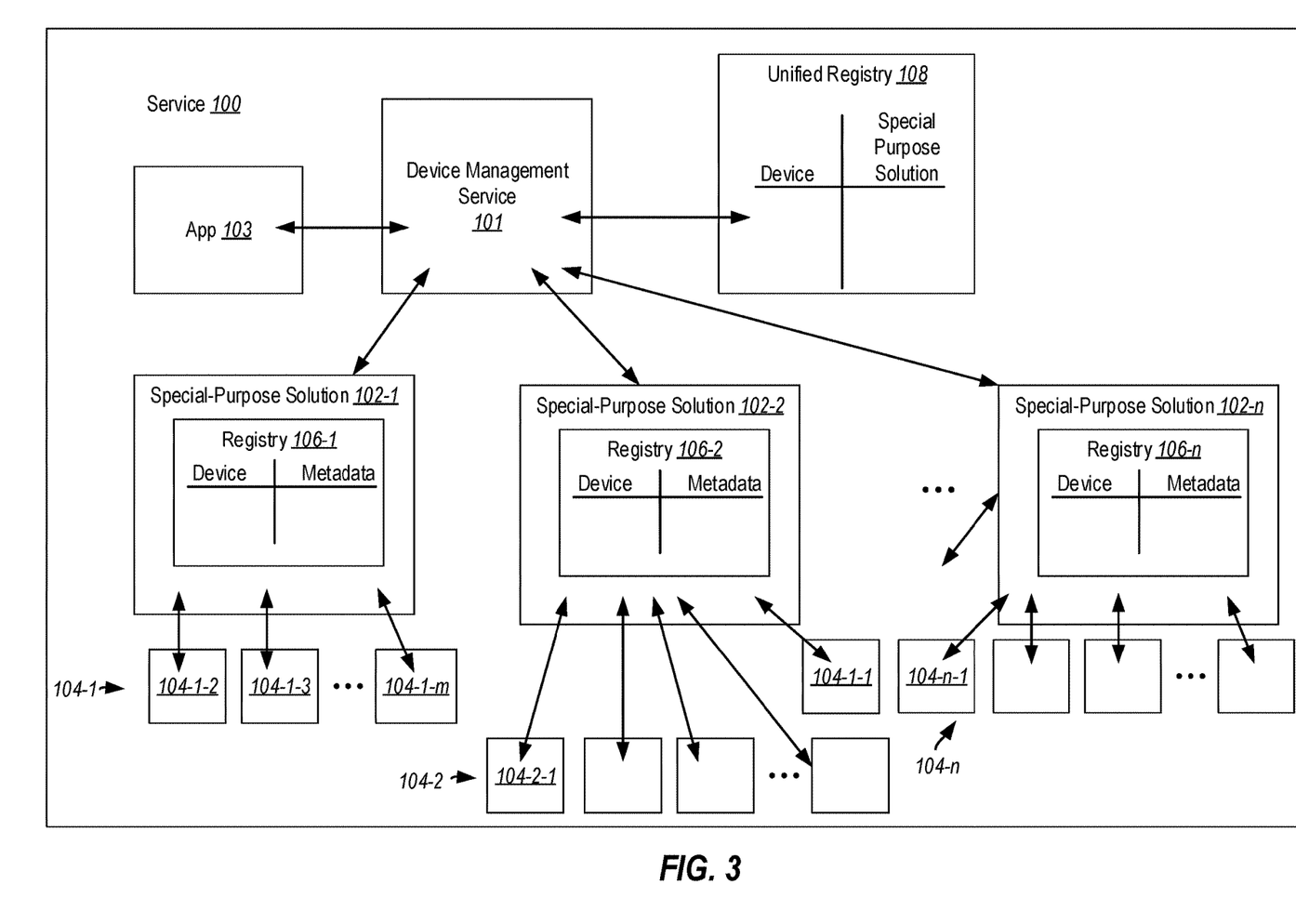
FIG. 3 illustrates the service for managing devices after a device has been reassigned to a new special-purpose solution.

A number of examples will now be illustrated with respect to FIGS. 1 and 3. FIG. 1 illustrates an initial case where device 104-1-1 is coupled to the special-purpose solution 102-1. FIG. 3 illustrates the system of FIG. 1 at a subsequent time when the device 104-1-1 is coupled to a different special-purpose solution, namely special-purpose solution 102-2.

In this example, the device 104-1-1 initially connects to the special-purpose solution 102-1. In this initial connection, the device 104-1-1 is provisioned by the special purpose solution 102-1 and is added to the registry 106-1 of the special-purpose solution 102-1. The addition to the registry 106-1 is communicated to the unified registry 108 where the device 104-1-1 is correlated with the special-purpose solution 102-1.

At a subsequent time, a determination is made to move the device 104-1-1 from the special-purpose solution 102-1 to the special purpose solution 102-2. This may occur for a number of different reasons. For example, the device 104-1-1 may be transferred to a different tenant of the service 100. Alternatively or additionally, the device 104-1-1 may move to a new physical location that is more proximate the special-purpose solution 102-2 than the special-purpose solution 102-1. Alternatively or additionally, the device 104-1-1 may be associated with a different service level agreement.

To affect the change, the unified registry 108 is updated with the change. At some point, the device 104-1-1 identifies a need to identify the appropriate special-purpose solution for the device 104-1-1. This may occur, for example, when the device 104-1-1 goes off-line and then reconnects to the service 100. Alternatively or additionally, the device 104-1-1 may identify that it has been blocked from the special-purpose solution 102-1 as a result of the changes made to the unified registry 108. The device 104-1-1 may then access the unified registry 108 (or a shadow copy, as illustrated in FIG. 2) to identify which special-purpose solution the device 104-1-1 should connect to.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
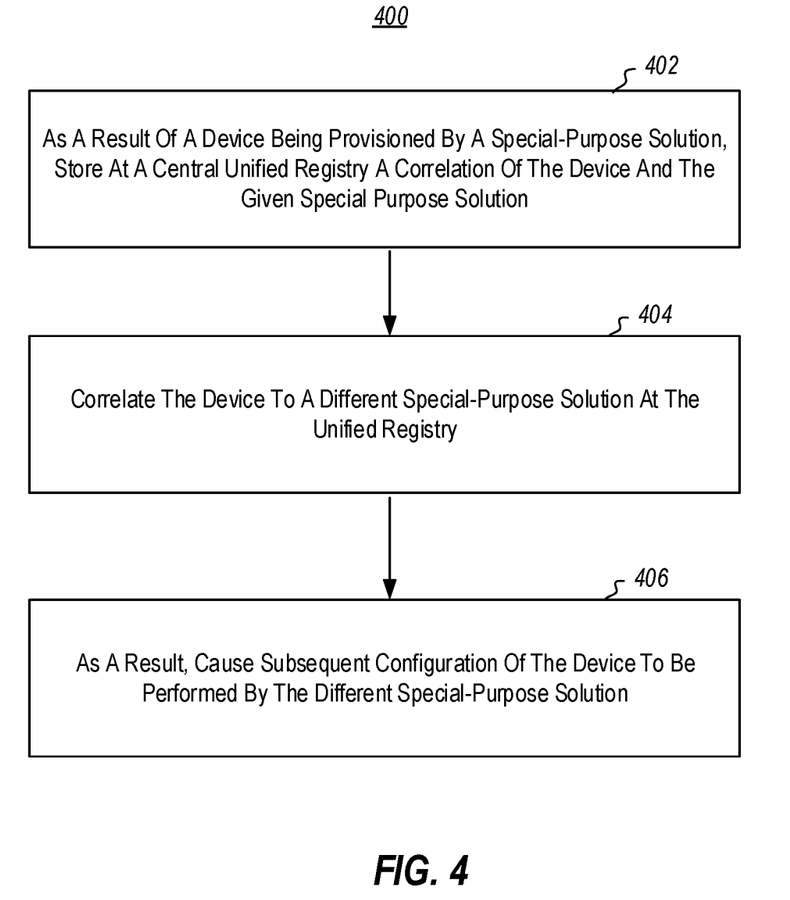
FIG. 4 illustrates a method of managing devices.

Referring now to FIG. 4, a method 400 is illustrated. The method 400 may be practiced in an IoT environment. The method 400 includes acts for managing devices in the IoT environment. The method 400 includes, as a result of a device being provisioned by a special-purpose solution, storing at a central unified registry a correlation of the device and the given special purpose solution (act 402).

The method 400 further includes correlating the device to a different special-purpose solution at the unified registry (act 404). For example, the correlation at the unified registry may be updated to assign a device to a different special-purpose solution.

The method 400 further includes causing subsequent configuration of the device to be performed by the different special-purpose solution (act 406). For example, the different special purpose solution will provide additional, updated, or replacement configuration to the device.

The method 400 may be practiced where the unified registry allows devices in different locations to be managed by local special-purpose solutions to meet a predetermined latency threshold, while still providing a central location where entities can query for information about the devices.

The method 400 may be practiced where the unified registry allows devices for different tenants to be managed by tenant-specific special-purpose solutions to meet a predetermined tenant data isolation threshold, while still providing a central location where entities can query for information about the devices.

The method 400 may be practiced where the unified registry allows devices subject to different service-level agreements to be managed by service level agreement specific special-purpose solutions to meet a predetermined service level agreement threshold, while still providing a central location where entities can query for information about the devices.

The method 400 may further include storing metadata for the device at the unified registry, the metadata comprising at least one of model number or firmware version of the device.

The method 400 may further include providing from the unified registry, a shadow copy of the unified registry to the different special-purpose solution.

The method 400 may further include receiving a request from the device for an identification of a special-purpose solution for the device, and as a result, identifying the different special-purpose solution to the device so that the subsequent configuration of the device can be performed by the different special-purpose solution.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special-purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special-purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special-purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
 one or more processors; and
 one or more computer-readable media having stored thereon instructions that are executable by the one or more processors to configure the computer system to manage devices in an IoT environment, including instructions that are executable to configure the computer system to perform at least the following:
as a result of a device being provisioned by a first special-purpose solution, store at a central unified registry a correlation of the device and the first special-purpose solution;
correlate the device to a second special-purpose solution at the unified registry, each of the first special-purpose solution and the second special-purpose solution separately including a collection of hardware and software configured to interface with a set of devices for configuring the devices; and
as a result of the correlation of the device to the second special-purpose solution, cause subsequent configuration of the device to be performed by the second special-purpose solution.

2. The computer system of claim 1, wherein the unified registry allows devices in different locations to be managed by local special-purpose solutions to meet a predetermined latency threshold, while still providing a central location where entities can query for information about the devices.

3. The method of claim 1, wherein the unified registry allows devices for different tenants to be managed by tenant-specific special-purpose solutions to meet a predetermined tenant data isolation threshold, while still providing a central location where entities can query for information about the devices.

4. The computer system of claim 1, wherein the unified registry allows devices subject to different service-level agreements to be managed by service level agreement specific special-purpose solutions to meet a predetermined service level agreement threshold, while still providing a central location where entities can query for information about the devices.

5. The computer system of claim 1, wherein the one or more computer-readable media further have stored thereon instructions that are executable by the one or more processors to configure the computer system to store metadata for the device at the unified registry, the metadata comprising at least one of model number or firmware version of the device.

6. The computer system of claim 1, wherein the one or more computer-readable media further have stored thereon instructions that are executable by the one or more processors to configure the computer system to provide from the unified registry, a shadow copy of the unified registry to the second special-purpose solution.

7. The computer system of claim 1, wherein the one or more computer-readable media further have stored thereon instructions that are executable by the one or more processors to configure the computer system to receive a request from the device for an identification of a special-purpose solution for the device, and as a result, identify the second special-purpose solution to the device so that the subsequent configuration of the device can be performed by the second special-purpose solution.

8. In an IoT environment, a method of managing devices in the IoT environment, the method comprising:
as a result of a device being provisioned by a first special-purpose solution, storing at a central unified registry a correlation of the device and the first special-purpose solution;
correlating the device to a second special-purpose solution at the unified registry, each of the first special-purpose solution and the second special-purpose solution separately including a collection of hardware and software configured to interface with a set of devices for configuring the devices; and
as a result of the correlation of the device to the second special-purpose solution, causing subsequent configuration of the device to be performed by the second special-purpose solution.

9. The method of claim 8, wherein the unified registry allows devices in different locations to be managed by local special-purpose solutions to meet a predetermined latency threshold, while still providing a central location where entities can query for information about the devices.

10. The method of claim 8, wherein the unified registry allows devices for different tenants to be managed by tenant-specific special-purpose solutions to meet a predetermined tenant data isolation threshold, while still providing a central location where entities can query for information about the devices.

11. The method of claim 8, wherein the unified registry allows devices subject to different service-level agreements to be managed by service level agreement specific special-purpose solutions to meet a predetermined service level agreement threshold, while still providing a central location where entities can query for information about the devices.

12. The method of claim 8, further comprising storing metadata for the device at the unified registry, the metadata comprising at least one of model number or firmware version of the device.

13. The method of claim 8, further comprising providing from the unified registry, a shadow copy of the unified registry to the second special-purpose solution.

14. The method of claim 8, further comprising receiving a request from the device for an identification of a special-purpose solution for the device, and as a result, identifying the second special-purpose solution to the device so that the subsequent configuration of the device can be performed by the second special-purpose solution.

15. A device management service:
one or more processors;
one or more computer-readable media having stored thereon instructions that are executable by the one or more processors;
wherein the device management service is configured to update a central unified registry as a result of devices being provisioned by a first special-purpose solution, to store at the central unified registry a correlation of the devices and the first special-purpose solution; and
wherein the device management service is configured to move devices to a second special-purpose solution by updating the correlations at the unified registry to cause subsequent configuration of the devices to be performed by the second special-purpose solution, each of the first special-purpose solution and the second special-purpose solution including a collection of hardware and software configured to interface with a set of devices for configuring the devices.

16. The device management service of claim 15, wherein the unified registry allows devices in different locations to be managed by local special-purpose solutions to meet a predetermined latency threshold, while still providing a central location where entities can query for information about the devices.

17. The device management service of claim 15, wherein the unified registry allows devices for different tenants to be managed by tenant-specific special-purpose solutions to meet a predetermined tenant data isolation threshold, while still providing a central location where entities can query for information about the devices.

18. The device management service of claim 15, wherein the unified registry allows devices subject to different service-level agreements to be managed by service level agreement specific special-purpose solutions to meet a predetermined service level agreement threshold, while still providing a central location where entities can query for information about the devices.

19. The device management service of claim 15, wherein the device management service is configured to search metadata on the unified registry correlated to devices at the unified registry, the metadata comprising at least one of model number or firmware version of the devices.

20. The device management service of claim 15, wherein the device management service is configured to provide from the unified registry, a shadow copy of the unified registry to the special-purpose solutions.

* * * * *